April 9, 1929.   J. W. WELSH   1,708,204

SPECTACLE TEMPLE AND METHOD OF MAKING THE SAME

Filed Dec. 8, 1923

Inventor:
James W. Welsh.
by David Rines
Attorney:-

Patented Apr. 9, 1929.

1,708,204

UNITED STATES PATENT OFFICE.

JAMES W. WELSH, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed December 8, 1923. Serial No. 679,338.

The present invention, while possessing features of more general usefulness, is more particularly related to spectacle temples of the so-called "cable" type, and to methods of making the same.

Cable temples usually comprise one or more strands, wound in more or less helical form about a core, to render the temple flexible. In the case of metal temples, the strands are very thin, and they may therefore be wound very close together. In the case of the much larger and heavier non-metallic temples, the helical coils are much thicker, and they can not be wound so compactly. At the rear portions of such temples, bent into ear-hook or other temple shapes, the strands visibly separate on the convex sides of the curves of the temples, providing dirt- and the other débris-collecting spots, besides rendering the temple unsightly. The wearer's hair, furthermore, catches in the crevices between the strands, causing annoyance and discomfort.

One object of the present invention is to improve upon temples of the above-described character, to the end that a better, more efficient and less expensive article may be produced. Other objects will be made clear in the course of the subjoined description, taken in connection with the accompanying drawings, and the scope of the invention will be particularly set forth in the appended claims.

Figure 1:
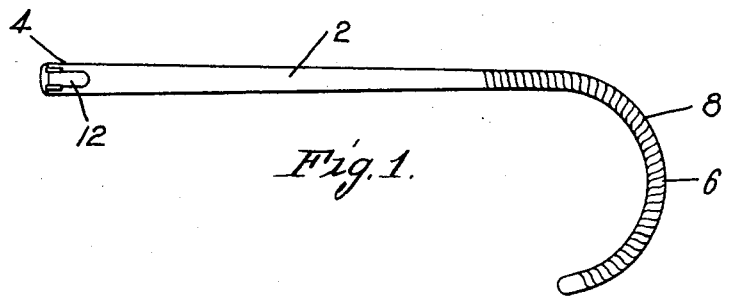
Figure 3:
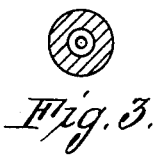
Figure 2:
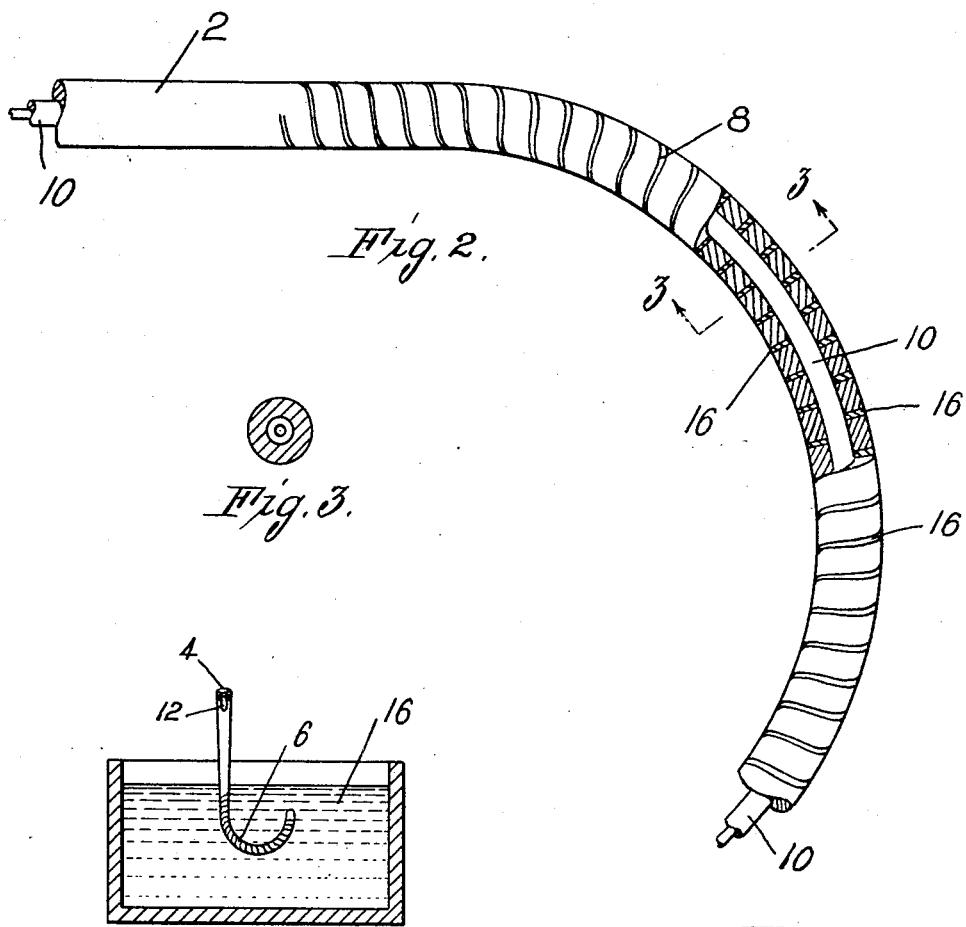
Figure 4:
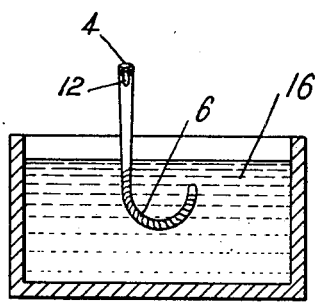

In the accompanying drawings, Fig. 1 is an elevation of a cable temple constructed according to a preferred embodiment of the present invention; Fig. 2 is a fragmentary enlarged elevation, partly in longitudinal section; Fig. 3 is a section taken upon the line 3—3 of Fig. 2; and Fig. 4 is a diagrammatic view illustrating the method of the present invention.

Cable temples of the above-described character may comprise a tube 2 of zylonite, celluloid, and the like, tapering from the larger end 4 towards the end 6 of smaller diameter. This tapered tube 2, though flexible, is not sufficiently so to produce, when the tapered end is bent into the shape of a hook, as shown in Fig. 1, a temple that may properly be called flexible. The portion of smaller diameter of the tube 2 is therefore cut into the form of a spiral or helix, as shown at 8, which renders it very yielding. As non-metallic material of the above-described character is resilient, the non-metallic material thus cut is maintained in its helical form by its own resiliency. A reinforcing rod 10 is inserted in the bore of the tube before the latter is bent into shape, and is fixed therein in any well known manner. The rod 10 may be of the same material of which flexible metal temples are made, or of any other suitable material. It is shown consisting of two elements, one inside the other. The helical portion 6 of the tube 2 will thus become stiffened, but it will have the same degree of flexibility as the metal rod 10. The tapered, helically cut portion of the tube 2, with the metal rod 10 inserted therein, is then bent into a hook or temple shape, as shown in the drawings, and the customary hinge plate 12 is added at the forward end 4 of the tube, completing the temple. Unsightly dirt-collecting and hair-catching cracks or crevices have a tendency to appear at the convex sides of the curves of temples so produced.

In order to eliminate these crevices, the temple is now, according to the preferred embodiment of the invention that is herein illustrated and described, dipped into a liquid elastic substance 16. This is not done until after the temple has first been bent into the desired normal shape. The liquid will enter the crevices between the coils of the helix up to the reinforcing rod and fill them. The temple should not be permitted to remain in the liquid longer than is necessary to effect this purpose. The temple is thereupon removed, the excess liquid is wiped off and the liquid allowed to harden. The hardened elastic substance will firmly adhere to the walls of the adjacent coils, binding them elastically together. The resulting temple retains its original shape, and is practically as flexible as it was before the dipping, but it contains no crevices.

Liquids and other soft substances suitable for the purpose are well known to persons skilled in the art, so need not be specifically enumerated here. It will further be obvious that the crevices may be filled by other methods than by dipping in such substances. The invention is also adapted for use with temples the cable portions of which are made by winding a strand around a core, and is by no means restricted to temples alone. Other modifications, too, will readily occur to persons skilled in the art, and all such are intended to be included within the scope of the appended claims.

What is claimed is:

1. The method of making an article of the class described that comprises mounting a spiral element about a core and introducing an elastic substance into the crevices between the coils of the spiral element from the core to the surface of the spiral element.

2. The method of making a spectacle temple that comprises shaping a spiral resilient element into the shape of a spectacle temple, introducing a soft elastic substance into the crevices between the coils of the spiral resilient element, and permitting the soft elastic substance to harden and to bind the adjacent coils elastically together.

3. An article of the class described comprising a spiral element mounted about a core, the crevices between the coils of the spiral being filled with an elastic substance from the core to the surface of the spiral element.

4. A spectacle temple comprising a spiral resilient element shaped into spectacle-temple shape, the crevices between the coils of the spiral being filled with an elastic substance that elastically binds the coils together.

5. A spectacle temple comprising a tube constituted of resilient, non-metallic material a portion of which is cut into the form of a helix, the crevices between the coils of the helix being filled with an elastic substance that elastically binds the coils together.

6. A spectacle temple comprising a tapered tube constituted of flexible, non-metallic material into which is inserted a reinforcing rod, a portion of smaller diameter of the tapered tube being cut into the form of a spiral, the cut portion of the tube and the reinforcing rod inserted therein being bent into the shape of a temple, and the crevices between the coils of the spiral being filled with an elastic substance that elastically binds the coils together.

7. A spectacle temple comprising a rod and a plurality of separated parts mounted about the rod, and an elastic substance entering between the parts to the rod, and extending from the rod to the outer surface of the elements to bind the parts together.

8. The method of making a spectacle temple that comprises shaping a spiral element into the shape of a spectacle temple, and introducing an elastic substance into the crevices between the coils of the spiral element.

9. A spectacle temple comprising a plurality of separated parts shaped into the shape of a spectacle temple, and an elastic substance between the separated parts that binds the parts together.

10. A spectacle temple comprising a spiral element shaped into the shape of a spectacle temple, the crevices between the coils of the spiral containing an elastic substance that binds the coils together.

11. The method of making a spectacle temple that comprises shaping a plurality of separated parts into the shape of a spectacle temple, and introducing an elastic substance between the separated parts to bind the parts together.

12. The method of making a spectacle temple that comprises shaping a spiral element into the shape of a spectacle temple, introducing an elastic substance into the crevices between the coils of the spiral element, and causing the elastic substance to bind the adjacent coils elastically together.

In testimony whereof, I have hereunto subscribed my name this 1st day of December, 1923.

JAMES W. WELSH.